Sept. 22, 1942.   L. J. F. ELL   2,296,429
SUCTION NOZZLE
Filed April 9, 1941
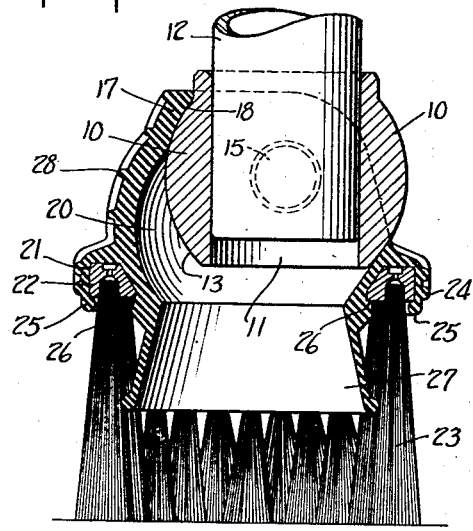
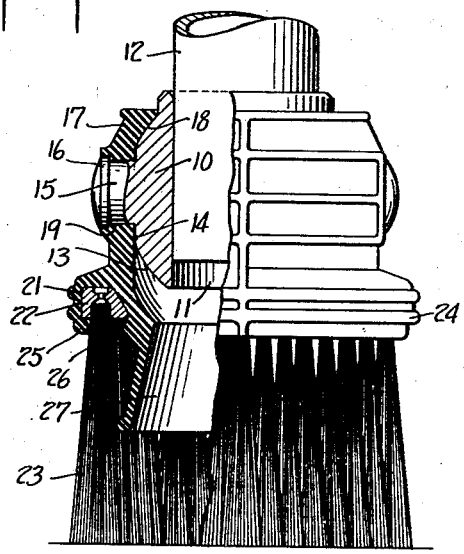
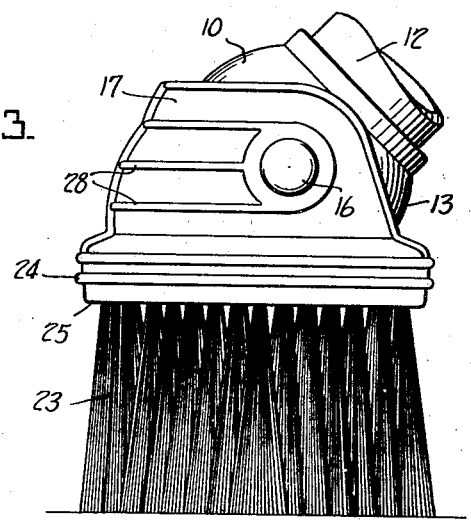
INVENTOR
Lars Johan Faith Ell
BY Thomas C. Beth
his ATTORNEY Patented Sept. 22, 1942

2,296,429

UNITED STATES PATENT OFFICE 2,296,429

SUCTION NOZZLE

Lars Johan Faith Ell, Stockholm, Sweden, assignor to Electrolux Corporation, Dover, Del., a corporation of Delaware Application April 9, 1941, Serial No. 387,570
In Sweden July 9, 1940

5 Claims. (Cl. 15—158)

My invention relates to a vacuum cleaner nozzle and more particularly to a nozzle provided with a swivel whereby the part forming the mouthpiece may have different angular positions with respect to the part which is connected to the handle.

In accordance with my invention, I provide an inner member of relatively hard material which is adapted to be connected to a tubular member which serves as both a handle and a conduit for connecting the nozzle to a source of suction. The outer surface of this member is formed as a surface of revolution and is embraced by an outer member made of elastic material, such as rubber, which carries the mouthpiece of the nozzle. The inner surface of this outer member corresponds to the outer surface of the inner member, whereby the two members may have relative pivotal movement. The elastic nature of the outer member causes it to snugly embrace the inner member so as to provide a substantially airtight joint and also to provide frictional engagement between the two so that unintentional pivoting will not take place. Another advantage of the elastic material is that the two members may be assembled without the use of any other fastening means, such as bolts or the like, inasmuch as the outer member may be stretched sufficiently to permit it to pass over projections or the like on the inner member for securing the two members together.

Further objects and advantages of my invention will be apparent from the following description, considered in connection with the accompanying drawing, which forms a part of this specification and of which:

Fig. 1 is a cross-sectional view of a nozzle in accordance with my invention;

Fig. 2 is a view partially in cross section, and is taken on a plane 90° from that of Fig. 1; and Fig. 3 is a side view of the nozzle shown in Figs. 1 and 2.

Referring more particularly to the drawing, reference character 10 designates an inner member made of relatively hard material, such as Bakelite or metal. This member is formed with a central passageway 11 which may be either cylindrical or slightly conical in order to frictionally receive a hollow member 12 which serves as both a handle for manipulating the nozzle and has a conduit for connecting it to a vacuum cleaner unit. A portion of the outer surface of the member 10 is formed as a surface of revolution 13. Opposite sides of the outer surface are flattened, as indicated at 14, and projections 15 extend outwardly from the centers of the flat surfaces 14. Projections 15 may be integral with member 10, or they may be in the form of pins permanently secured to the member, as by being cast therein, or they may be removably threaded into the member. Projections 15 are preferably formed with a slightly enlarged head 16.

An outer member 17, made of rubber or other suitable elastic material, is formed with an inner surface 18 which is a surface of revolution corresponding to the surface 13 on the inner member. Member 17 is formed with apertures 19 which are adapted to receive projections 15. The resilient nature of the member 17 permits it to be stretched sufficiently to pass over the projections 15 and to permit the enlarged heads 16 on the projections to pass through the openings 19. These openings are preferably countersunk in order to receive the heads 16. The member 17 is enlarged, as indicated at 20, in order to avoid restricting the flow of air into passageway when the member 10 is pivoted to an inclined position, as would be the case if the surface of revolution 18 were continued down to the lower part of the member 17.

The member 17 is formed with an annular channel 21 within which is received a ring 22 carrying brush bristles 23. The material of the member 17 outside of the ring 22 forms a bumper guard 24 which prevents the ring 22 from marring furniture. The lower edge of the bumper 24 is formed with an inwardly extending bead 25 which, together with a shoulder 26, serves to retain the ring 22 in place without other fastening means.

The member 17 is preferably provided with a conical skirt 27 disposed within the ring of brush bristles. The purpose of this skirt is to support the bristles and to prevent them from being drawn up into the member 17.

It will be apparent from the above description that the member 17 may be pivoted through an arc of approximately 90° with respect to the inner member 10 about an axis coinciding with the centers of the projections 15. The resiliency of member 17 causes the surface 18 thereon to snugly embrace the surface 13 of the member 10 so as to prevent leakage between the two. Also, there is sufficient friction between these two surfaces to prevent unintentional pivoting of the members and hence when they are placed in one position this is retained until a moderate amount of force is applied to pivot them to some other position. It is apparent that no removable fastening means is required to secure the members 16 and 17 together. As previously described, the member 17 may be stretched sufficiently to pass over the projections 15 and, when in assembled position, these projections retain the two members securely together.

The outer member may be provided with ribs or the like 28 for providing a hand grip, as well as to enhance the appearance of the nozzle.

While I have shown and described one more or less specific embodiment of my invention, it is to be understood that this has been done for purposes of illustration only and that the scope of my invention is not to be limited thereby, but is to be determined from the appended claims.

What I claim is:

1. In a suction nozzle, an inner member of hard material formed with a passageway therethrough and having at least a portion of its outer surface formed as a surface of revolution, an outer member of elastic material having an inner surface corresponding to said outer surface and movably co-operating therewith, said outer member having an inlet opening therein and being formed with an annular channel around said opening, and a bristle carrying ring disposed in said channel, the resiliency of said outer member effecting an airtight seal between said members and retaining said ring within said channel.

2. In a suction nozzle, an inner member of hard material formed with a passageway therethrough and having at least a portion of its outer surface formed as a surface of revolution, an outer member of elastic material having an inner surface corresponding to said outer surface and movably co-operating therewith, a pair of diametrically opposed pins permanently secured to and extending outwardly from said inner member and engaging recesses formed in said outer member, the resiliency of said outer member effecting an air tight seal between said surfaces, and means forming a mouth piece on said outer member.

3. In a suction nozzle, an inner member of hard material formed with a passageway therethrough and having opposite outer flat circular surfaces bounded by spherical surfaces, an outer member of elastic material having inner surfaces corresponding to said flat and spherical surfaces on said inner member, a pair of pins permanently secured to said inner member and extending outwardly from the centers of said flat surfaces and engaging recesses formed in said outer member whereby said members are turnably secured together, the resiliency of said outer member effecting an air tight seal between the members, and means forming a mouth piece on said outer member.

4. In a suction nozzle, an inner member of hard material formed with a passageway therethrough and having at least a portion of its outer surface formed as a surface of revolution, an outer member of elastic material having an inner surface corresponding to said outer surface and movably co-operating therewith, a pair of diametrically opposed pins extending outwardly from said inner member and having enlarged heads at their outer ends, said outer member being formed with apertures for receiving said pins, the diameter of said apertures being normally substantially the same as that of said pins, the resiliency of said outer member permitting enlargement of said apertures to accommodate passage therethrough of said enlarged heads and effecting an airtight seal between said members, and means forming a mouthpiece on said outer member.

5. In a suction nozzle an inner member of hard material formed with a passageway therethrough and having at least a portion of its outer surface spherical, an outer member of elastic material having an inner spherical surface corresponding to said outer surface, whereby said members are turnable with respect to each other, the resiliency of said outer member effecting an airtight seal between said surfaces, means forming a mouth piece on said outer member communicating with the interior thereof, said outer member being formed with an opening communicating with the interior thereof and spaced from said mouth piece, and said inner member having a portion projecting through said opening, said opening being so located and dimensioned that the portions of said outer member bounding the opening limit turning of said inner member from a position in which the center line of said passageway is approximately at right angles to the center line of said mouth piece to a position in which said center lines are approximately parallel.

LARS JOHAN FAITH ELL.